US009142025B2

(12) United States Patent
Park et al.

(10) Patent No.: US 9,142,025 B2
(45) Date of Patent: Sep. 22, 2015

(54) METHOD AND APPARATUS FOR OBTAINING DEPTH INFORMATION USING OPTICAL PATTERN

(75) Inventors: Ji Young Park, Daejeon-si (KR); Kwang Hyun Shim, Daejeon-si (KR); Seung Woo Nam, Daejeon-si (KR); Jae Hoo Lee, Daejeon-si (KR); Myung Ha Kim, Daejeon-si (KR); Bon Ki Koo, Daejeon-si (KR); Dong Won Han, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 364 days.

(21) Appl. No.: 13/615,448

(22) Filed: Sep. 13, 2012

(65) Prior Publication Data

US 2013/0088575 A1    Apr. 11, 2013

(30) Foreign Application Priority Data

Oct. 5, 2011   (KR) .................. 10-2011-0101200
May 30, 2012   (KR) .................. 10-2012-0057186

(51) Int. Cl.
  *G01B 11/25*     (2006.01)
  *G01B 11/255*    (2006.01)
  (Continued)

(52) U.S. Cl.
  CPC .......... *G06T 7/0057* (2013.01); *G01B 11/2513* (2013.01); *G06T 2207/10028* (2013.01)

(58) Field of Classification Search
  CPC ............. G06K 9/00; G06F 3/01; G01B 11/22

USPC ............................................. 348/46; 382/184
See application file for complete search history.

(56) References Cited

U.S. PATENT DOCUMENTS

| 6,611,343 | B1 | 8/2003 | Frankowski |
| 7,433,024 | B2 | 10/2008 | Garcia et al. |
| 2003/0026475 | A1 | 2/2003 | Yahashi et al. |

FOREIGN PATENT DOCUMENTS

| DE | 19639999 A1 | 3/1998 |
| DE | 202007000471 U1 | 10/2007 |

(Continued)

OTHER PUBLICATIONS

J. Batlle, E. Mouaddib and J. Salvi, "Recent Progress in Coded Structured Light As a Technique to Solve the Correspondence Problem: A Survey", Dec. 5, 1996, Elsevier Science Ltd, Pattern Recognition, vol. 31, No. 7, pp. 963-982.*

(Continued)

*Primary Examiner* — Sath V Perungavoor
*Assistant Examiner* — Clifford Hilaire

(57) ABSTRACT

Provided is an apparatus and method for obtaining depth information using an optical pattern. The apparatus for obtaining depth information using the optical pattern may include: a pattern projector to generate the optical pattern using a light source and an optical pattern projection element (OPPE), and to project the optical pattern towards an object area, the OPPE comprising a pattern that includes a plurality of pattern descriptors; an image obtaining unit to obtain an input image by photographing the object area; and a depth information obtaining unit to measure a change in a position of at least one of the plurality of pattern descriptors in the input image, and to obtain depth information of the input image based on the change in the position.

14 Claims, 11 Drawing Sheets

(51) Int. Cl.
*G01B 13/14* (2006.01)
*G06T 7/00* (2006.01)

(56) References Cited

FOREIGN PATENT DOCUMENTS

| DE | 102009015204 A1 | 10/2010 |
| DE | 112009001652 T5 | 1/2012 |
| EP | 0 182 469 A1 | 5/1986 |

OTHER PUBLICATIONS

Jing Xu, Ning Xi, Chi Zhang and Quan Shi, "Real-time 3D Shape Measurement System based on Single Structure Light Pattern", May 3-8, 2010, 2010 IEEE International Conference on Robotics and Automation Anchorage Convention District, p. 121-126.*

J. Park et al., "Using structured light for efficient depth edge detection", Image Vis. Comput. (2008), doi:10.1016/j.imavis.2008.01.006.*

Xu, Jing, et al. "Real-time 3D shape measurement system based on single structure light pattern." Robotics and Automation (ICRA), 2010 IEEE International Conference on. IEEE, 2010.*

\* cited by examiner

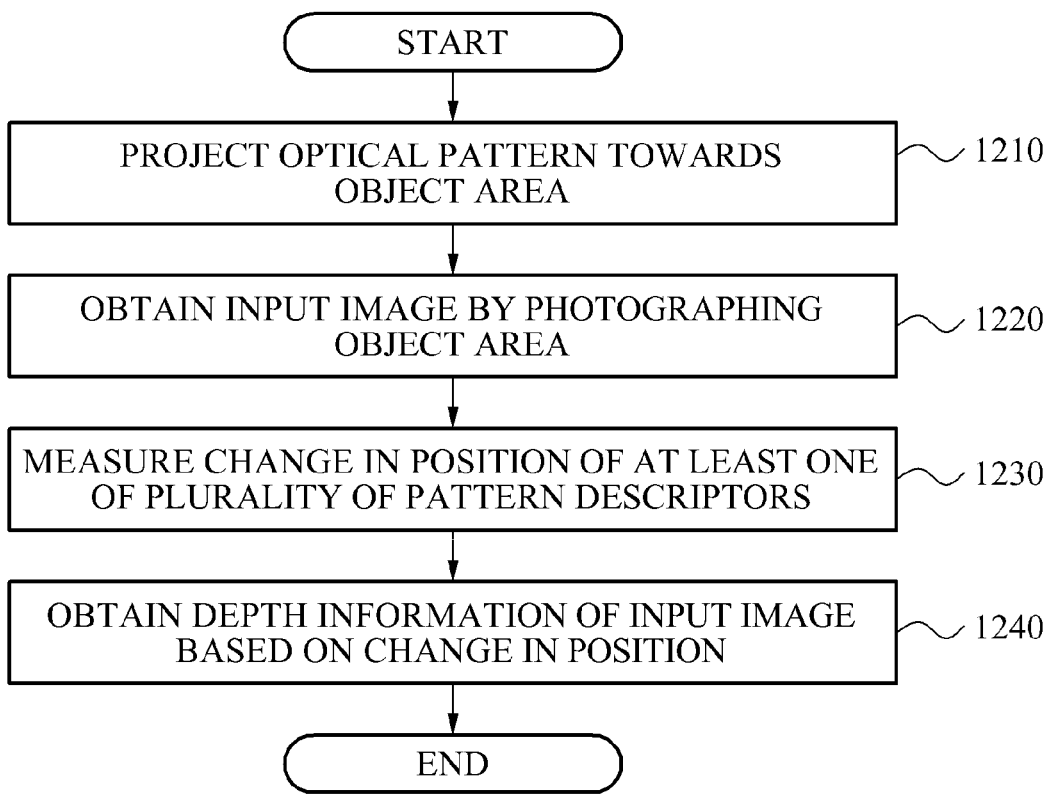

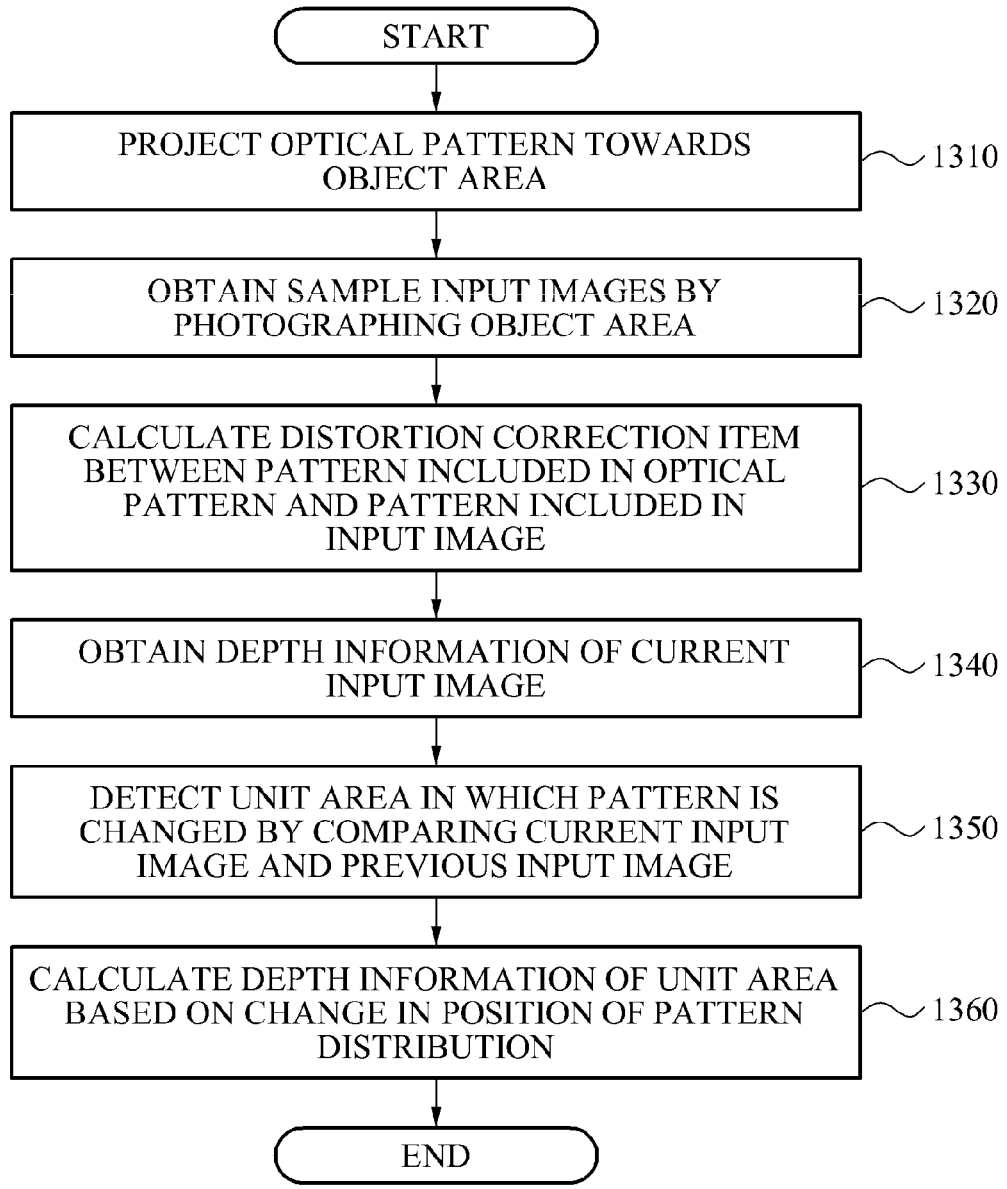

METHOD AND APPARATUS FOR OBTAINING DEPTH INFORMATION USING OPTICAL PATTERN

CROSS-REFERENCE TO RELATED APPLICATIONS

This application claims the priority benefit of Korean Patent Application No. 10-2011-0101200, filed on Oct. 5, 2011, and Korean Patent Application No. 10-2012-0057186, filed on May 30, 2012, in the Korean Intellectual Property Office, the disclosures of which are incorporated herein by reference.

BACKGROUND

1. Field of the Invention

The present invention relates to an apparatus and method for obtaining depth information using an optical pattern, and more particularly, to a system for obtaining three-dimensional (3D) information such as depth information.

2. Description of the Related Art

Depth information or a depth value corresponds to information indicating a distance on a space. An image including depth information may be referred to as a depth image.

One of methods to obtain a depth image is an optical method. The optical method may be classified into a passive obtainment scheme and an active obtainment scheme.

The passive obtainment scheme is a scheme of obtaining an image from at least two viewpoints using a plurality of cameras. The active obtainment scheme is a scheme of projecting light onto a space and interpreting the projected light.

The passive obtainment scheme, which is also known as stereo vision technology, may obtain a depth image using two cameras, for example, both eyes of a human being, or a multi-view camera. When it is difficult to find a feature point at which a brightness value changes within a space of which distance is to be measured, the passive obtainment scheme may not accurately measure a distance.

The active obtainment scheme may not be significantly affected by illumination of a space or the presence or absence of a feature point, and may relatively accurately measure a distance. However, in the case of a visible light source that generally employs the active obtainment scheme, due to a dazzling phenomenon, it may be difficult to employ the active obtainment scheme when a person is present. Also, in a circumstance accompanied with a motion, the active obtainment scheme may be inappropriate to detect the motion by projecting a plurality of patterns.

Accordingly, a single pattern projection scheme using an infrared (IR) light source may be employed to overcome the above issue of the active obtainment scheme and to obtain 3D information.

SUMMARY

An aspect of the present invention provides an apparatus and method for obtaining depth information using an optical pattern that may be applicable to a general indoor environment without causing a user inconvenience.

Another aspect of the present invention also provides an apparatus and method for obtaining depth information that may obtain a high resolution of three-dimensional (3D) information using various types of coded patterns.

Another aspect of the present invention also provides an apparatus and method for obtaining depth information of an object area by projecting, towards the object area, an optical pattern of an angle view greater than an angle view of a camera using an optical pattern projection element (OPPE).

Another aspect of the present invention also provides an apparatus and method for obtaining depth information that may avoid inconvenience of obtaining reference images in advance to obtain depth information of a current input image.

Another aspect of the present invention also provides an apparatus and method for obtaining depth information that may decrease a calculation amount used to obtain depth information of a current input image, and may also quickly obtain depth information of the current input image.

According to an aspect of the present invention, there is provided an apparatus for obtaining depth information using an optical pattern, the apparatus including: a pattern projector to generate the optical pattern using a light source and an OPPE, and to project the optical pattern towards an object area, the OPPE including a pattern that includes a plurality of pattern descriptors; an image obtaining unit to obtain an input image by photographing the object area; and a depth information obtaining unit to measure a change in a position of at least one of the plurality of pattern descriptors in the input image, and to obtain depth information of the input image based on the change in the position.

According to another aspect of the present invention, there is provided a method of obtaining depth information using an optical pattern, the method including: generating the optical pattern using a light source and an OPPE to project the optical pattern towards an object area, the OPPE including a pattern that includes a plurality of pattern descriptors; obtaining an input image by photographing the object area; measuring a change in a position of at least one of the plurality of pattern descriptors in the input image; and obtaining depth information of the input image based on the change in the position.

According to still another aspect of the present invention, there is provided a method of obtaining depth information using optical pattern, the method including: generating the optical pattern using a light source and an OPPE to project the optical pattern towards an object area, the OPPE including a pattern that includes a plurality of pattern descriptors; obtaining sample input images by photographing the object area; calculating a distortion correction item between a pattern included in the optical pattern and a pattern included in the input image; and measuring a change in a position of at least one of the plurality of pattern descriptors in the input image; and obtaining depth information of the input image based on the change in the position and the distortion correction item.

Each of the sample input images may be photographed when a reflective surface is positioned at a predetermined distance within the object area.

EFFECT

According to embodiments of the present invention, it is possible to obtain depth information in a general indoor environment without causing a user inconvenience, and to obtain a high resolution of three-dimensional (3D) information using various types of patterned codes.

Also, according to embodiments of the present invention, it is possible to obtain depth information through a simple configuration of a projector and an input unit, and to avoid inconvenience of obtaining reference images in advance to obtain depth information of a current input image.

Also, according to embodiments of the present invention, it is possible to decrease a calculation amount used to obtain depth information of a current input image, and to quickly obtain depth information of the current input image.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 12 is a flowchart illustrating a method of obtaining depth information according to an embodiment of the present invention; and FIG. 13 is a flowchart illustrating a method of obtaining depth information according to another embodiment of the present invention

DETAILED DESCRIPTION

Figure 1:
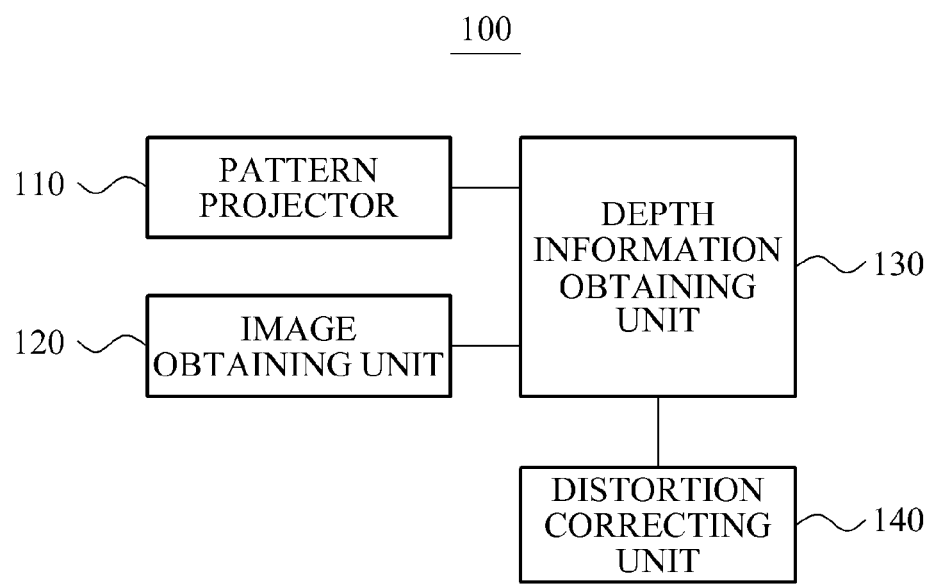
FIG. 1 is a block diagram illustrating a configuration of an apparatus for obtaining depth information using an optical pattern according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A basic principle of the present invention is to project a pattern on a space, to analyze a pattern of an input image obtained using an image obtaining apparatus such as a camera, and to thereby calculate distance information on the space using a "displacement" of a pattern occurring based on a distance between the camera and an object. The definition and various examples of the "displacement of pattern" will be further described with reference to FIG. 8 through FIG. 11.

FIG. 1 is a block diagram illustrating a configuration of an apparatus 100 for obtaining depth information using an optical pattern according to an embodiment of the present invention.

Referring to FIG. 1, the depth information obtaining apparatus 100 using the optical pattern may include a pattern projector 110, an image obtaining unit 120, and a depth information obtaining unit 130. Also, the depth information obtaining apparatus 100 may further include a distortion correcting unit 140.

The pattern projector 110 may project, towards an object area, an optical pattern including a pattern that includes a plurality of pattern descriptors, and may include a light source and an optical pattern projection element (OPPE). For example, the optical pattern may be a projecting image that is obtained by making the light incident from the light source pass through the OPPE. The pattern projector 110 may generate the optical pattern using the optical source and the OPPE, and may project the optical pattern towards the object area.

A configuration example of the pattern projector 110 will be further described with reference to FIG. 2.

The pattern projector 110 may be a projector to projecting an infrared ray (IR).

Here, the light incident from the light source may be an IR.

The term "pattern descriptor" indicates a dot, a straight line, curved line, a figure in a predetermined shape, or an irregular pattern, and the term "pattern" indicates a shape that includes at least one pattern descriptor.

The term "object area" indicates an area onto which the optical pattern is projected. A measurement target of depth information may be positioned on the object area. Also, the object area may indicate an area in which the optical pattern is received on a reflective surface that is positioned at a maximum measurable distance of the depth information obtaining apparatus 100.

The image obtaining unit 120 may obtain an input image by photographing the object area. The image obtaining unit 120 may include a camera.

Figure 6:
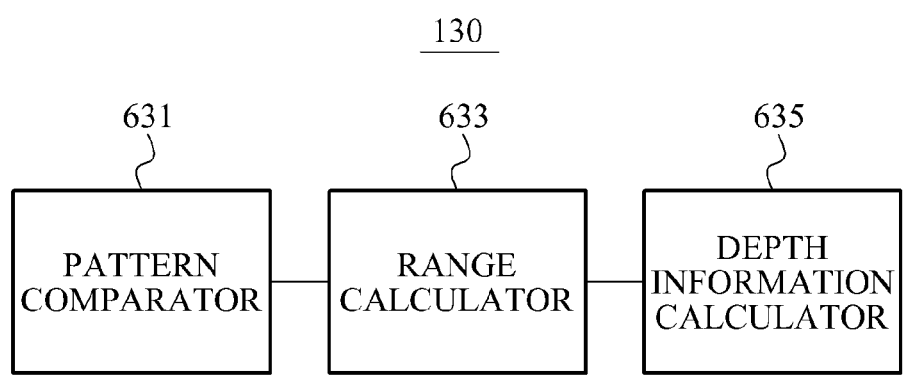
FIG. 6 is a block diagram illustrating a configuration of a depth information obtaining unit of FIG. 1.

The depth information obtaining unit 130 may measure a change in a position of at least one of the plurality of pattern descriptors in the input image, and may obtain depth information of the input image based on the change in the position. The depth information obtaining unit 130 may be configured as shown in FIG. 6, and may include at least one processor. Here, the at least one processor may be configured to perform a functionality of obtaining depth information of the input image.

The depth information obtaining unit 130 may obtain depth information of the input image according to Equation 1:

$$z(x_i, y_i) = g(x_i, y_i, x_p, y_p) + w_z = \frac{D}{2\left(x_p \tan\left(\frac{\theta_p}{2}\right) - x_i \tan\left(\frac{\theta_i}{2}\right)\right) + \tan\left(\frac{\theta_i}{2}\right) - \tan\left(\frac{\theta_p}{2}\right)} + w_z \quad \text{[Equation 1]}$$

In Equation 1, $z(x_i, y_i)$ denotes a depth value of a pattern descriptor having coordinates $(x_i, y_i)$ in the input image, $(x_p, y_p)$ denotes coordinates of the optical pattern, $\theta_p$ denotes a projection angle of the pattern projector 110, $\theta_i$ denotes an incidence angle of the image obtaining unit 120, D denotes a center distance between the pattern projector 110 and the image obtaining unit 120, and $w_z$ denotes a distortion correction item between a pattern included in the optical pattern and a pattern included in the input image.

The distortion correcting unit 140 may calculate a distortion correction item between a pattern included in the optical pattern and a pattern included in the input image, using sample input images. An operation of the distortion correcting unit 140 will be further described with reference to FIG. 13.

Here, each of the sample input images may be photographed when a reflective surface is positioned at a predetermined distance within the object area. Here, the depth information obtaining unit 130 may obtain depth information of a current input image, using the distortion correction item.

The sample input images may include a first sample input image that is photographed when the reflective surface is positioned at a maximum measurable distance and a second sample input image that is photographed when the reflective surface is positioned at a minimum measurable distance.

Figure 2:
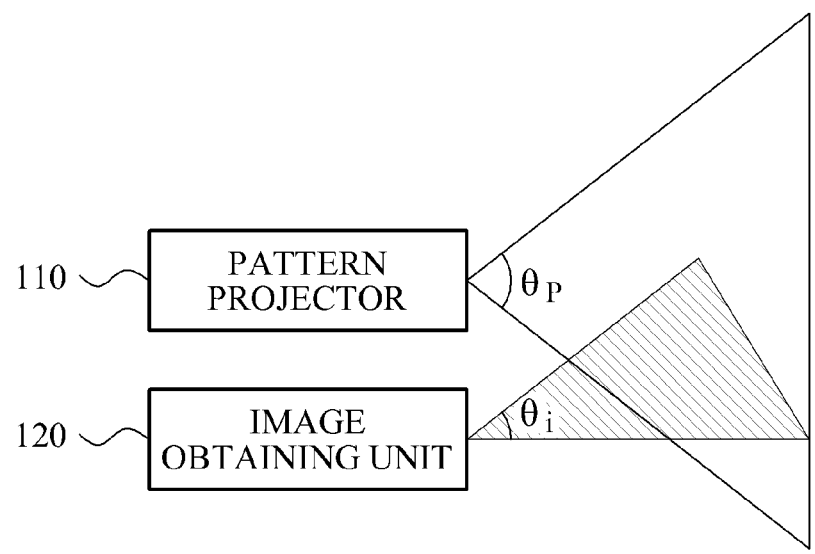
FIG. 2 is a diagram to describe a projection angle of a pattern projector and an image obtaining unit of FIG. 1.

FIG. 2 is a diagram to describe a projection angle of the pattern projector 110 and the image obtaining unit 120 of FIG. 1.

Referring to FIG. 2, a view angle $\theta_p$ of the optical pattern projected from the pattern projector 110 is greater than a view angle $\theta_i$ of the input image of the image obtaining unit 120. That is, the optical pattern may need to be diffused at an angle greater than the view angle of the image obtaining unit 120.

When $\theta_p$ is greater than $\theta_i$, the depth information obtaining unit 130 may accurately detect a change in a pattern by comparing the projecting image and the input image. In this instance, how greater $\theta_p$ is than $\theta_i$ may vary based on configuration examples of the depth information obtaining apparatus 100.

Figure 3:
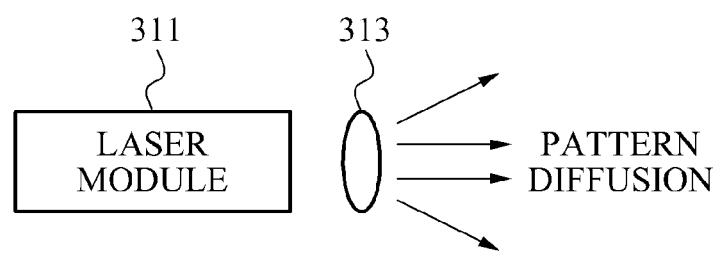
FIG. 3 is a diagram to describe a principle of the pattern projector of FIG. 1.

FIG. 3 is a diagram to describe a principle of the pattern projector 110 of FIG. 1.

Referring to FIG. 3, the pattern projector 110 may include a laser module 311 and an OPPE 313. According to the configuration of FIG. 3, the pattern projector 110 may be a high resolution of a subminiature IR pattern projecting apparatus.

The OPPE 313 may accurately focus shapes of patterns on an object area by projecting, on a space, predetermined patterns that are designed to obtain depth information.

The OPPE 313 may include a lens, a mask, or a diffractive optical element (DOE). Types of the OPPE 313 may be very various.

The OPPE 313 may change a refractive index, and may be provided in a planar form or a cubic structure. Also, the OPPE 313 may be formed of a material capable of partially changing a spatial phase of incident light or a material capable of changing transmissivity of incident light.

The OPPE 313 may project a pattern while maintaining a predetermined brightness by changing a diffraction amount of incident light based on an incidence angle of incident light.

The OPPE 313 may have a structure in which a predetermined pattern is etched on a material corresponding to a predetermined lens. Accordingly, the pattern may indicate a form in which at least one pattern descriptor is included and is etched by the OPPE 313.

The depth information obtaining apparatus according to an embodiment of the present invention may accurately project a pattern towards the object area through the OPPE 313 and thus, may be miniaturized compared to a conventional art requiring a collimating lens and a plurality of DOEs.

Also, the OPPE 313 may project a coded pattern of which displacement is readily verifiable and thus, it is possible to obtain a high resolution depth image compared to the conventional art.

Figure 4A:
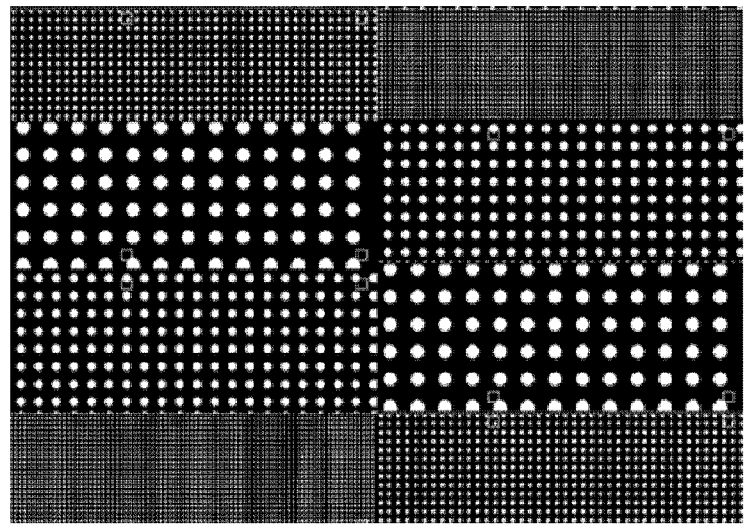
FIGS. 4A and 4B are images to describe an example of a pattern generated by an optical pattern projection element (OPPE) of FIG. 3.
Figure 4B:
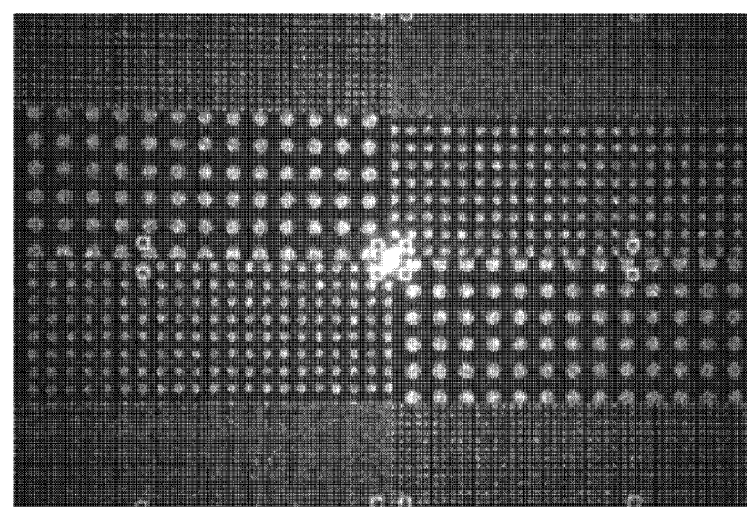

FIGS. 4A and 4B are images to describe an example of a pattern generated by the OPPE 313 of FIG. 3.

FIG. 4A shows an example of a pattern designed by the OPPE 313, and FIG. 4B shows an example of an optical pattern that is generated by making a laser pass through a pattern. For example, FIG. 4B shows an example of a moment of the laser, passing through the OPPE 313, that is photographed using an IR camera.

As shown in FIGS. 4A and 4B, a pattern descriptor may be provided in a form of a dot. Also, a pattern may be configured using a plurality of pattern descriptors having different dot sizes. By arranging different types of pattern descriptors, it is possible to more readily verify a displacement of the pattern.

The pattern descriptors may be arranged at a high density compared to a decrease in an occupancy size on a space. Reconstruction of 3D information may be performed by analyzing a pattern image projected on the space. Accordingly, a resolution of depth information may increase according to an increase in the number of bits encoded in a pattern to be designed. That is, as various types of pattern descriptors are densely arranged, it is possible to obtain a high resolution depth map.

Figure 5:
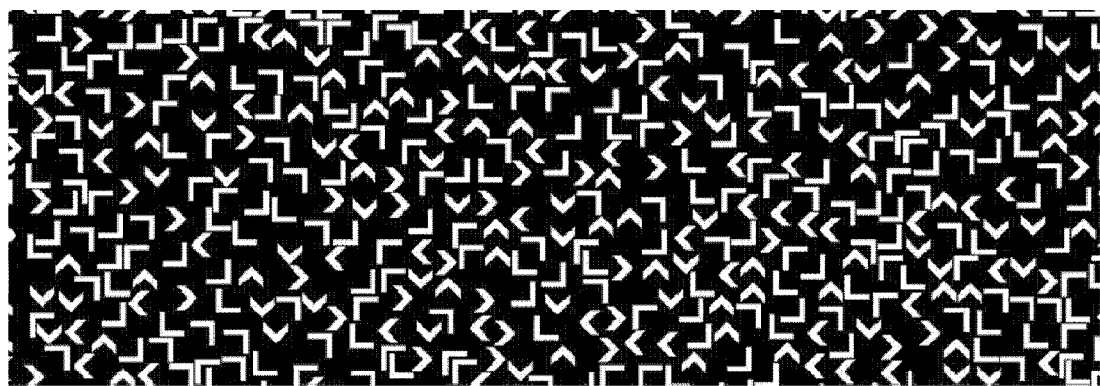
FIG. 5 is an image to describe an example of a pattern according to an embodiment of the present invention.

FIG. 5 is an image to describe an example of a pattern according to an embodiment of the present invention.

FIG. 5 shows an example in which a pattern formed on the OPPE 313 includes eight types of pattern descriptors. For example, the pattern of FIG. 5 may include pattern descriptors shown in the following Table 1:

TABLE 1

| ┐ | ┌ | ┗ | ┛ | ﹥ | ∨ | ﹤ | ∧ |
|---|---|---|---|---|---|---|---|

Each of the pattern descriptors shown in Table 1 may occupy a small space and have a shape distinguishable among the descriptors based on a rotation direction. Accordingly, when calculating a displacement between a pattern included in the optical pattern and a pattern included in the input image, a size of a reference area may be reduced. Here, the "reference area" may indicate basic window for finding an area in which the pattern is changed. For example, when the entire image of the pattern is divided into N (M×M) blocks (hereinafter, referred to as a unit area), one of the N unit areas may be a reference area. As described above, according to an embodiment of the present invention, it is possible to decrease the size of the reference area for finding an area in which the pattern is changed and thus, it is possible to obtain a high resolution depth map.

In addition to the pattern descriptors shown in Table 1, other shapes, such as "⊐" "TT", "A", "T", "L" and the like, distinguishable based on the rotation direction may be further included.

The pattern descriptors may be arranged based on at least one of the following conditions:

First, a combination of pattern descriptors within a unit area may be arranged to not be repeated using a shape and arrangement position of each pattern descriptor. That is, pattern descriptors arranged within each unit area may have different combinations for each unit area. Also, a combination of pattern descriptors arranged in a single unit area may be arranged to be different from a combination of pattern descriptors arranged in a neighboring unit area. Hereinafter, the term "combination of pattern descriptors" will be used as the same meaning as a "pattern distribution".

Second, pattern descriptors may be uniformly distributed instead of being distributed to be concentrative in one place.

Third, pattern descriptors may not be arranged to be in line.

Fourth, the above first through third conditions may be satisfied using a pseudo random code generation scheme and a space filtering scheme.

Fifth, each unit area may have a uniqueness based on the above first through third conditions, and each unit area may function as a single reference area.

Accordingly, it is possible to reduce a size of the reference area, and to minimize a section in which depth information cannot be found due to the absence of a pattern.

Accordingly, a pattern may be divided into N unit areas, and each of the N unit areas may be classified by a combination of different pattern descriptors, and N denotes an integer. Here, the combination of pattern descriptors may be determined based on a shape and an arrangement position of each pattern descriptor.

Also, the total number of the plurality of pattern descriptors may be m, and the number of types of the plurality of pattern descriptors may be k, and the m pattern descriptors may be arranged within the pattern at a uniform density. Each of m and k denotes an integer and m>k. For example, in FIGS. 4A and 4B, the number of types of pattern descriptors may be eight, and a total number of arranged pattern descriptors may be 500 to tens of thousands.

FIG. 6 is a block diagram illustrating a configuration of the depth information obtaining unit 130 of FIG. 1.

Referring to FIG. 6, the depth information obtaining unit 130 may include a pattern comparator 631, a range calculator 633, and a depth information calculator 635. The distortion correcting unit 140 may be provided within the depth information obtaining unit 130, which may be different from the configurations of FIGS. 1 and 6. Each of the pattern comparator 631, the range calculator 633, and the depth information calculator 635 may be configured as a single processor and may also be configured as a unit processor.

The pattern comparator 631 may detect a reference area in which the pattern is changed by comparing a current input image and a previous input image. Accordingly, the depth information obtaining unit 130 may obtain depth information only about a unit area in which a pattern is changed and thus, may quickly obtain the depth information.

The range calculator 633 may calculate a range in which a position of the pattern is changeable in the current input image based on the optical pattern. The range in which the position of the pattern is changeable will be further described with reference to FIGS. 7 through 11.

The depth information calculator 635 may detect an area having the same pattern distribution as a pattern distribution of the reference area within the range in which the position of the pattern is changeable, and may calculate depth information of the reference area based on a change in the position of the pattern distribution.

Figure 7:
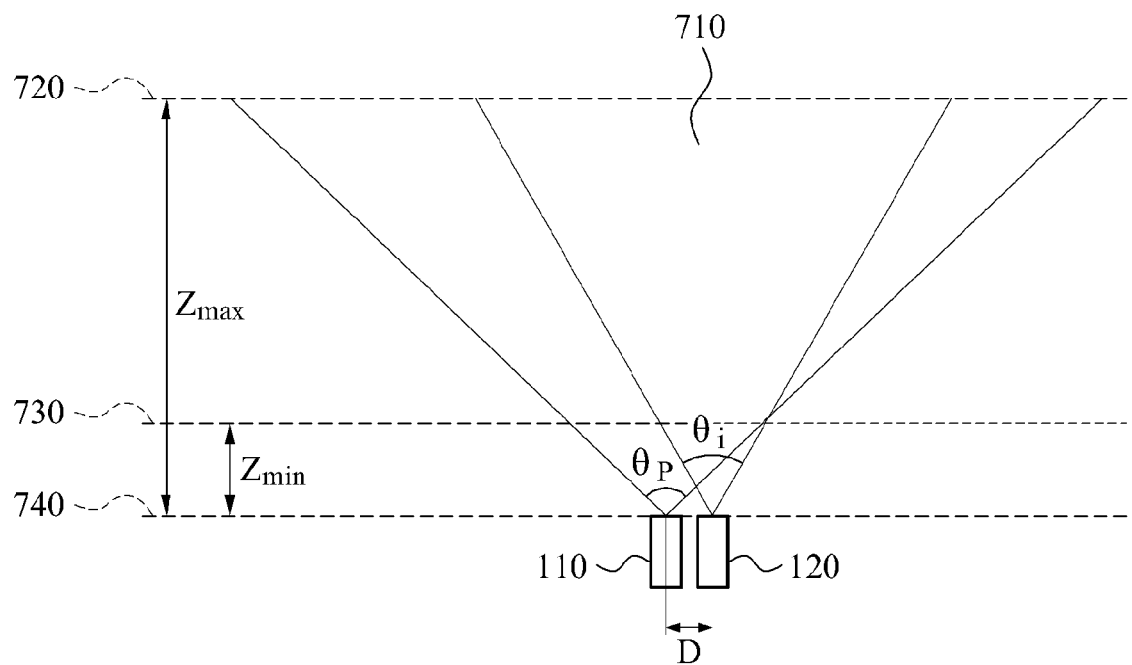
FIG. 7 is a diagram to describe a concept of a method of obtaining depth information according to an embodiment of the present invention.

FIG. 7 is a diagram to describe a concept of a method of obtaining depth information according to an embodiment of the present invention.

Referring to FIG. 7, D denotes a distance between the pattern projector 110 and the image obtaining unit 120. An object area 710 may be defined based on a reflective surface 720 that is positioned at a maximum measurable distance $Z_{max}$ from a projecting surface 740 and a projection angle $\theta_p$. Also, the object area 710 may be defined based on the reflective surface 720 and an incident angle $\theta_i$ of the image obtaining unit 120.

Here, the reflective surface indicates a surface on which the optical pattern is reflected, such as an area in which an object, for example, a hand of a user is positioned, and the like.

In FIG. 7, a reflective surface 730 indicates a surface that is formed on a minimum measurable distance $Z_{min}$.

The maximum measurable distance $Z_{max}$ and the minimum measurable distance $Z_{min}$ may be determined based on a performance of an image sensor, $\theta_p$, and $\theta_i$, and may vary based on a configuration scheme of the depth image obtaining apparatus.

FIGS. 8A and 8B, FIGS. 9A and 9B, and FIGS. 10A and 10B are diagrams to describe an example of a method of obtaining depth information according to an embodiment of the present invention.

Figure 8A:
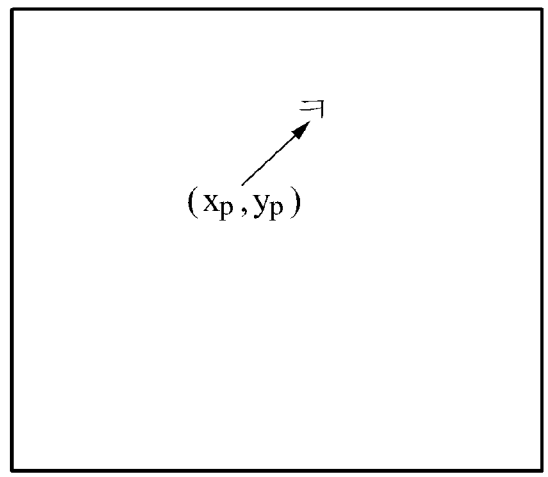
FIGS. 8A and 8B, FIGS. 9A and 9B, and FIGS. 10A and 10B are diagrams to describe an example of a method of obtaining depth information according to an embodiment of the present invention.

FIG. 8A shows an example of indicating a position of a pattern descriptor "ㅋ" in an optical pattern. Here, the position of the pattern descriptor "ㅋ" may be expressed as a form of coordinates such as $(x_p, y_p)$. Coordinates $(x_p, y_p)$ of the pattern descriptor "ㅋ" may be expressed as a normalized value between 0 and 1.

Figure 8B:
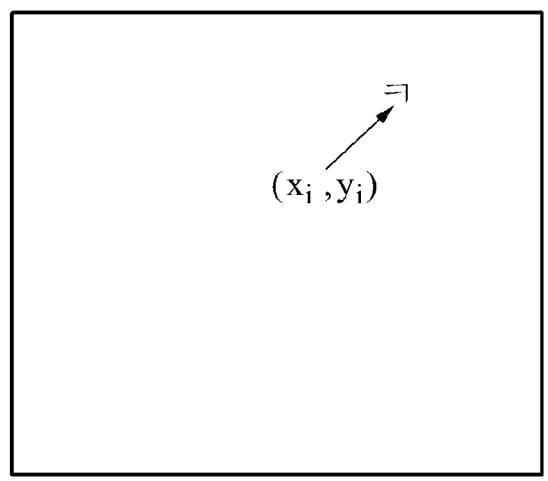

FIG. 8B shows an example of indicating a position of a pattern descriptor "ㅋ" in an input image. Here, the position of the pattern descriptor "ㅋ" may be expressed as a form of coordinates such as $(x_i, y_i)$. Coordinates $(x_i, y_i)$ of the pattern descriptor "ㅋ" may be expressed as a normalized value between 0 and 1.

Figure 9A:
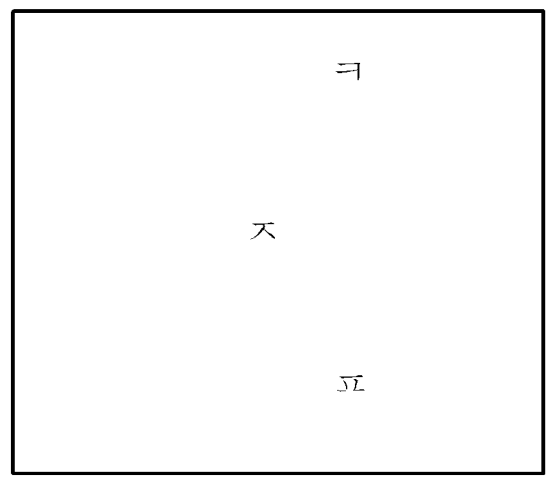
Figure 9B:
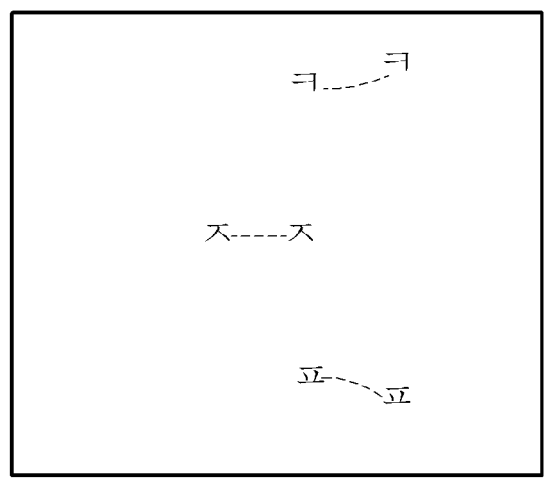

FIG. 9A shows an example in which pattern descriptors "ㅋ", "ㅈ", and "ㅍ" are arranged in an optical pattern, and FIG. 9B shows an example of a range in which a position of each of the pattern descriptors "ㅋ", "ㅈ", and "ㅍ" is variable. Here, the range in which the position is variable may be determined based on a measurable distance of a depth camera that is included in the image obtaining unit 120. For example, when a measurable distance of the depth camera is 0.5 meters to 5 meters, the "range in which the position is variable" may be determined as the range of a few pixels to tens of pixels.

Figure 10A:
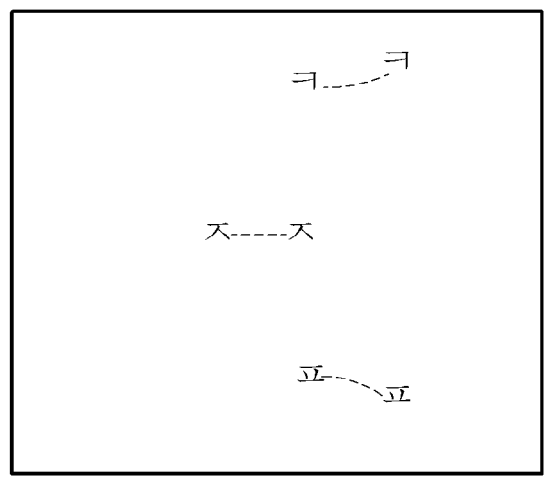
Figure 10B:
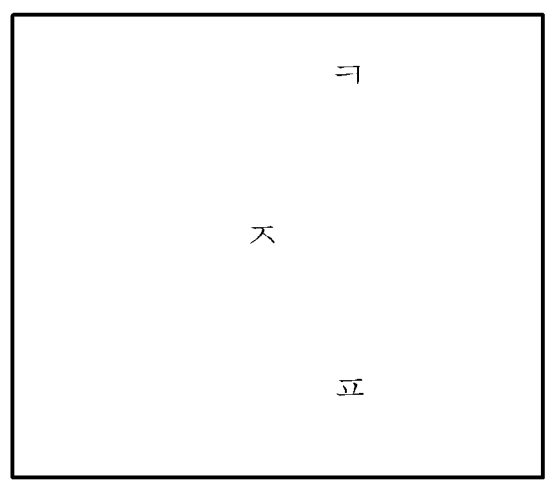

FIG. 10A shows a range of each of "ㅋ", "ㅈ", and "ㅍ" that may be viewable in an optical pattern when each of the pattern descriptors "ㅋ", "ㅈ", and "ㅍ" is positioned in the input image as shown in FIG. 10B.

Figure 11:
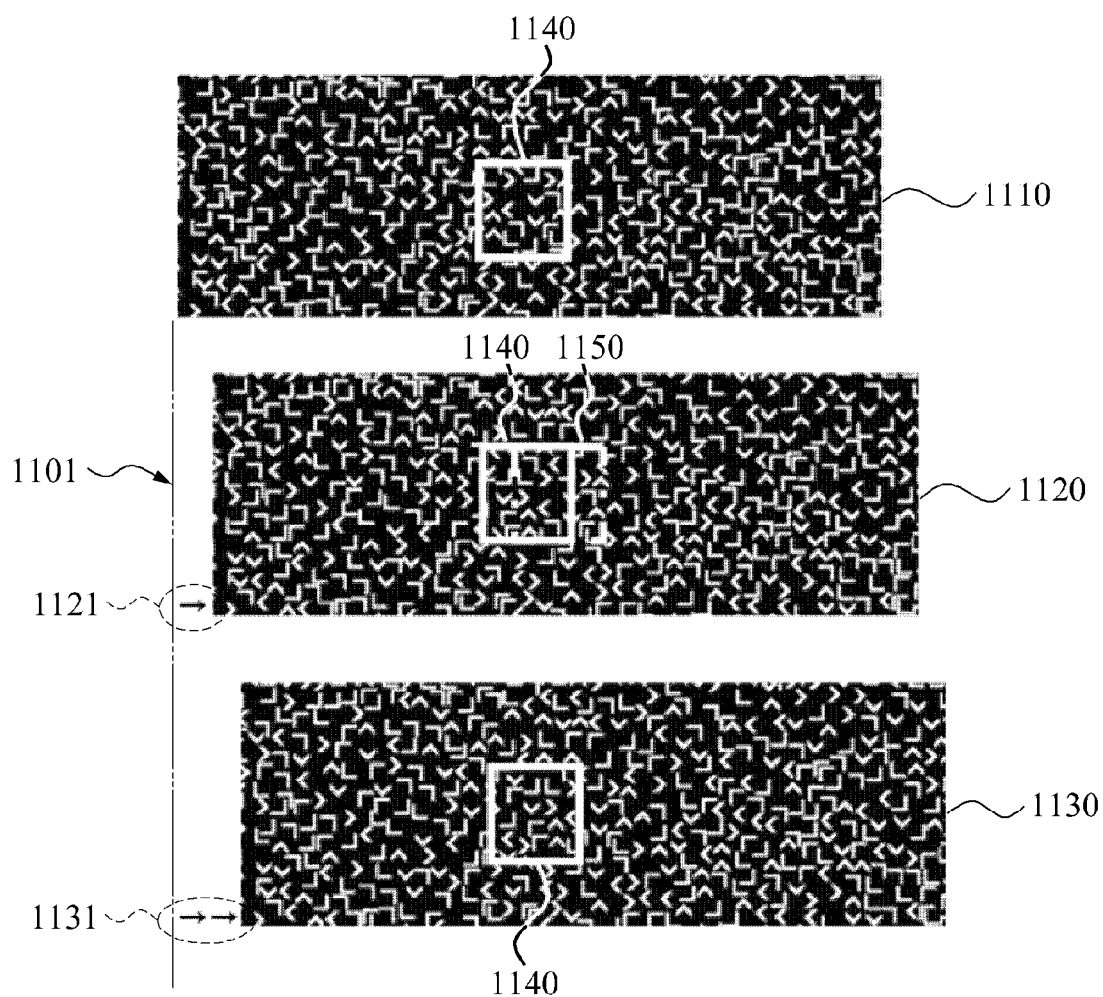
FIG. 11 is a diagram to describe an operation of the image obtaining unit and the depth information obtaining unit of FIG. 1.

FIG. 11 is a diagram to describe an operation of the image obtaining unit 120 and the depth information obtaining unit 130 of FIG. 1.

An optical pattern 1110 of FIG. 11 may correspond to the optical pattern of FIG. 5.

An input image corresponding to the optical pattern 1110 may vary depending on a distance of a reflective surface. As an example, a pattern of the optical pattern 1110 may be provided in a shifted form into a predetermined direction in the input image, based on the distance of the reflective surface. A change in the pattern may occur as the shifted form into various directions instead of being into the predetermined direction.

A reference image 1140 of FIG. 11 may have a size of 10×10.

When the reflective surface is positioned at a first distance, a first input image 1120 may be provided in a shifted form by a first change amount 1121. Here, a unit area 1150 having the same pattern combination as the reference area 1140 may be detected at a position shifted by the first change amount 1121. Here, the depth information obtaining unit 130 may calculate distance information using the first change amount 1121.

Also, when the reflected surface is positioned at a second distance, a second input image 1130 may be provided in a shifted form by a second change amount 1131. Here, the depth information obtaining unit 130 may calculate depth information using the first change amount.

Also, the depth information obtaining unit 130 may calculate a difference between the first change amount 1121 and the second change amount 1131 by comparing the first input image 1120 and the second input image 1130, and may also calculate a change in a depth of the reference area 1140 based on the difference between the first change amount 1121 and the second change amount 1131.

A pattern relationship between an optical pattern and an input image based on a reflected distance may be defined as the following Equation 2:

$$z(x_i, y_i) = g(x_i, y_i, x_p, y_p) = \quad \text{[Equation 2]}$$
$$\frac{D}{2\left(x_p\tan\left(\frac{\theta_p}{2}\right) - x_i\tan\left(\frac{\theta_i}{2}\right)\right) + \tan\left(\frac{\theta_i}{2}\right) - \tan\left(\frac{\theta_p}{2}\right)}$$

In Equation 2, $z(x_i, y_i)$ denotes a depth value of a pattern descriptor having coordinates $(x_i, y_i)$ in the input image. In Equation 2, $y_i = y_p$.

Here, $x_i$ may be defined as shown in Equation 3:

$$x_i = f(x_p, y_p, \theta_p, \theta_i, z(x_i, y_i)) = \quad \text{[Equation 3]}$$
$$\frac{\tan\left(\frac{\theta_p}{2}\right)}{\tan\left(\frac{\theta_i}{2}\right)}\left(x_p - \frac{1}{2}\right) + \frac{1}{2}\left(1 - \frac{D}{z(x_i, y_i)\tan\left(\frac{\theta_i}{2}\right)}\right)$$

The depth information obtaining unit 130 may obtain depth information of the input image by calculating a depth value with respect to all the pixels included in the input image.

In Equation 2, a distortion of a distance-based pattern and a distortion that may occur due to a hardware apparatus are not considered.

Accordingly, a pattern relationship between the optical pattern and the input image may be corrected based on the distortion of the distance-based pattern and the distance that may occur due to the hardware apparatus.

That is, by reflecting a distortion that a shape of a pattern descriptor is transformed based on a distance, and a noise characteristic of hardware apparatuses that constitute the depth information obtaining apparatus 100, it is possible to obtain more accurate distance information.

The depth information obtaining unit 130 or the distortion correcting unit 140 may obtain the relational expression in which a distortion correction item is reflected according to the following Equation 4 through Equation 6:

$$x_i = f(x_p, y_p, \theta_p, \theta_i, z(x_i, y_i)) + w_x = \quad \text{[Equation 4]}$$
$$\frac{\tan\left(\frac{\theta_p}{2}\right)}{\tan\left(\frac{\theta_i}{2}\right)}\left(x_p - \frac{1}{2}\right) + \frac{1}{2}\left(1 - \frac{D}{z(x_i, y_i)\tan\left(\frac{\theta_i}{2}\right)}\right) + w_z$$

$$y_i = y_p + w_y \quad \text{[Equation 5]}$$

$$z(x_i, y_i) = g(x_i, y_i, x_p, y_p) + w_z = \quad \text{[Equation 6]}$$
$$\frac{D}{2\left(x_p\tan\left(\frac{\theta_p}{2}\right) - x_i\tan\left(\frac{\theta_i}{2}\right)\right) + \tan\left(\frac{\theta_i}{2}\right) - \tan\left(\frac{\theta_p}{2}\right)} + w_z$$

Here, distortion correction items $W_x$, $W_y$, $W_z$ may be obtained using actually measured sample data set $(x_i, y_i, x_p, y_p, Z)$. Here, according to an increase in the number of sample input images, and according to an increase in an order of a distortion correction equation, it is possible to obtain a more accurate solution of the distortion correction equation.

Here, the sample input images may include an input image that is obtained when the reflected surface is positioned at $Z_{min}$ and an input image that is obtained when the reflected surface is positioned at $Z_{max}$ of FIG. 7. Also, the sample input images may further include an input image obtained from a reflected surface that is positioned at a distance of $(Z_{max} - Z_{min})/2$. Also, the sample input images may further include an input image that is obtained when the reflected surface is present at a position between $Z_{min}$ and $Z_{max}$.

FIG. 12 is a flowchart illustrating a method of obtaining depth information according to an embodiment of the present invention.

The depth information obtaining method of FIG. 12 may be performed by the depth information obtaining apparatus 100 of FIG. 1.

In operation 1210, the depth information obtaining apparatus 100 may project an optical pattern towards an object area.

In operation 1220, the depth information obtaining apparatus 100 may obtain an input image by photographing the object area.

In operation 1230, the depth information obtaining apparatus 100 may measure a change in a position of at least one of a plurality of pattern descriptors in the input image.

In operation 1240, the depth information obtaining apparatus 100 may obtain depth information of the input image based on the change in the position.

That is, the depth information obtaining apparatus 100 may calculate depth information of the input image using Equation 1 or Equation 2. Here, a distortion correction item of Equation 2 may be a value that is pre-calculated and thereby is stored.

In operation 1240, the depth information obtaining apparatus 100 may detect a unit area in which the pattern is changed by comparing a current input image and a previous input image, may calculate a range in which a position of the pattern is changeable in the current input image based on the optical pattern, may obtain a change area having the same pattern distribution as a pattern distribution of the unit area within the range in which the position of the pattern is changeable, and may calculate depth information of the unit area based on a change in the position of a pattern distribution.

FIG. 13 is a flowchart illustrating a method of obtaining depth information according to another embodiment of the present invention.

The depth information obtaining method of FIG. 13 may be performed by the depth information obtaining apparatus 100 of FIG. 1.

In operation 1310, the depth information obtaining apparatus 100 may project an optical pattern towards an object area.

In operation 1320, the depth information obtaining apparatus 100 may obtain sample input images by photographing the object area. Here, each of the sample input images may be photographed when a reflective surface is positioned at a predetermined distance within the object area.

Here, the sample input images may include a first sample input image that is photographed when the reflective surface is positioned at a maximum measurable distance and a second sample input image that is photographed when the reflective surface is positioned at a minimum measurable distance.

In operation 1330, the depth information obtaining apparatus 100 may calculate a distortion correction item between a pattern included in the optical pattern and a pattern included in an input image, using the sample input images.

That is, the depth information obtaining apparatus 100 may calculate the relational expression in which the distortion correction item is reflected as shown in Equation 6.

In operation 1340, the depth information obtaining apparatus 100 may measure a change in a position of at least one of a plurality of pattern descriptors in the input image, and may obtain depth information of the input image based on the change in the position and the distortion correction item.

Here, the depth information obtaining apparatus 100 may obtain depth information of the current input image using Equation 10.

In operation 1350, the depth information obtaining apparatus 100 may detect a unit area in which the pattern is changed by comparing the current input image and a previous input image.

For example, the current input image may be the second input image 1130 of FIG. 11 and the previous input image may be the first input image 1120 of FIG. 11.

Here, the unit area in which the pattern is changed may be referred to as a reference area. A unit area having the same pattern distribution as a pattern distribution of the reference area may be referred to as a change area. For example, the reference area may be the reference area 1140 of FIG. 11 and the change area may be the unit area 1150 of FIG. 11.

In operation 1360, the depth information obtaining apparatus 100 may calculate depth information of a corresponding unit area, that is, a reference area based on the change in the position of the pattern distribution.

As described, since depth information is calculated only with respect to the area in which the pattern distribution is changed by comparing the previous input image and the current input image, it is possible to quickly obtain depth information.

The above-described exemplary embodiments of the present invention may be recorded in computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for obtaining depth information using an optical pattern, the apparatus comprising:
   a pattern projector to generate the optical pattern using a light source and an optical pattern projection element (OPPE), and to project the optical pattern towards an object area, the OPPE comprising a pattern that includes a plurality of pattern descriptors;
   an image obtaining unit to obtain an input image by photographing the object area; and
   a depth information obtaining unit to measure a change in a position of at least one of the plurality of pattern descriptors in the input image, and to obtain depth information of the input image based on the change in the position,
   wherein the pattern of the OPPE is adapted to obtain the depth information,
   wherein the OPPE is configured to accurately focus shapes of the pattern of the OPPE on the object area by projecting on a space, and
   wherein the depth information obtaining unit obtains depth information of the input image according to Equation 1:

$$z(x_i, y_i) = g(x_i, y_i, x_p, y_p,) + w_z = \frac{D}{2\left(x_p\tan\left(\frac{\theta_p}{2}\right) - x_i\tan\left(\frac{\theta_i}{2}\right)\right) + \tan\left(\frac{\theta_i}{2}\right) - \tan\left(\frac{\theta_p}{2}\right)} + w_z$$ [Equation 1]

where $z(x_i, y_i)$ denotes a depth value of a pattern descriptor having coordinates $(x_i, y_i)$ in the input image, $(x_p, y_p)$ denotes coordinates of the optical pattern, $\theta_p$ denotes a projection angle of the pattern projector, $\theta_i$ denotes an incidence angle of the image obtaining unit, D denotes a center distance between the pattern projector and the image obtaining unit, and $w_z$ denotes a distortion correction item between a pattern included in the optical pattern and a pattern included in the input image.

2. The apparatus of claim 1, wherein the plurality of pattern descriptors comprises a dot, a line, or a surface, or has a shape distinguishable between descriptors based on a rotation direction.

3. The apparatus of claim 1, wherein:
   the pattern is divided into N unit areas, and each of the N unit areas is classified by a combination of different pattern descriptors, and N denotes an integer, and
   the combination of pattern descriptors is determined based on a shape and an arrangement position of each pattern descriptor.

4. The apparatus of claim 1, wherein the total number of the plurality of pattern descriptors is m, and a number of types of the plurality of pattern descriptors is k, and the m pattern descriptors are arranged within the pattern at a uniform density, and each of m and k denotes an integer and m>k.

5. The apparatus of claim 1, further comprising:
   a distortion correcting unit to calculate a distortion correction item between a pattern included in the optical pattern and a pattern included in the input image, using sample input images,
   wherein the depth information obtaining unit obtains depth information of a current input image, using the distortion correction item, and
   each of the sample input images is photographed when a reflective surface is positioned at a predetermined distance within the object area.

6. The apparatus of claim 5, wherein the sample input images comprise a first sample input image that is photographed when the reflective surface is positioned at a maximum measurable distance and a second sample input image that is photographed when the reflective surface is positioned at a minimum measurable distance.

7. The apparatus of claim 1, wherein the depth information obtaining unit comprises:
   a pattern comparator to detect a reference area in which the pattern is changed by comparing a current input image and a previous input image;
   a range calculator to calculate a range in which a position of the pattern is changeable in the current input image based on the optical pattern; and
   a depth information calculator to detect an area having the same pattern distribution as a pattern distribution of the reference area within the range in which the position of the pattern is changeable, and to calculate depth information of the reference area based on a change in the position of the pattern distribution.

8. A method of obtaining depth information using an optical pattern, the method comprising:
   generating the optical pattern using a light source and an optical pattern projection element (OPPE) to project the optical pattern towards an object area, the OPPE comprising a pattern that includes a plurality of pattern descriptors;

obtaining, using an image obtaining unit, an input image by photographing the object area;

measuring a change in a position of at least one of the plurality of pattern descriptors in the input image; and obtaining depth information of the input image based on the change in the position, wherein the pattern of the OPPE is adapted to obtain the depth information, wherein the OPPE is configured to accurately focus shapes of the pattern of the OPPE on the object area by projecting on a space, and wherein the obtaining comprises obtaining depth information of the input image according to Equation 1:

$$z(x_i, y_i) = g(x_i, y_i, x_p, y_p,) + w_z = \frac{D}{2\left(x_p \tan\left(\frac{\theta_p}{2}\right) - x_i \tan\left(\frac{\theta_i}{2}\right)\right) + \tan\left(\frac{\theta_i}{2}\right) - \tan\left(\frac{\theta_p}{2}\right)} + w_z \quad \text{[Equation 1]}$$

where $z(x_i, y_i)$ denotes a depth value of a pattern descriptor having coordinates $(x_i, y_i)$ in the input image, $(x_p, y_p)$ denotes coordinates of the optical pattern, $\theta_p$ denotes a projection angle of the pattern projector, $\theta_i$ denotes an incidence angle of the image obtaining unit, D denotes a center distance between the pattern projector and the image obtaining unit, and $w_z$ denotes a distortion correction item between a pattern included in the optical pattern and a pattern included in the input image.

9. The method of claim 8, wherein the plurality of pattern descriptors comprises a dot, a line, or a surface, or has a shape distinguishable between descriptors based on a rotation direction.

10. The method of claim 8, wherein the pattern is divided into N unit areas, and each of the N unit areas is classified by a combination of different pattern descriptors, and N denotes an integer, and the combination of pattern descriptors is determined based on a shape and an arrangement position of each pattern descriptor.

11. The method of claim 8, wherein the total number of the plurality of pattern descriptors is m, and the number of types of the plurality of pattern descriptors is k, and the m pattern descriptors are arranged within the pattern at a uniform density, and each of m and k denotes an integer and m>k.

12. The method of claim 8, wherein the obtaining further comprises:

detecting a unit area in which the pattern is changed by comparing a current input image and a previous input image;

calculating a range in which a position of the pattern is changeable in the current input image based on the optical pattern;

obtaining a change area having the same pattern distribution as a pattern distribution of the unit area within the range in which the position of the pattern is changeable; and calculating depth information of the unit area based on a change in the position of a pattern distribution.

13. A method of obtaining depth information using an optical pattern, the method comprising:

generating the optical pattern using a light source and an optical pattern projection element (OPPE) to project the optical pattern towards an object area, the OPPE comprising a pattern that includes a plurality of pattern descriptors;

obtaining, using an image obtaining unit, one or more sample input images by photographing the object area;

calculating a distortion correction item between a pattern included in the optical pattern and a pattern included in the one or more sample input images; and measuring a change in a position of at least one of the plurality of pattern descriptors in an input image; and obtaining depth information of the input image based on the change in the position and the distortion correction item, wherein each of the sample input images is photographed when a reflective surface is positioned at a predetermined distance within the object area, wherein the pattern of the OPPE is adapted to obtain the depth information, wherein the OPPE is configured to accurately focus shapes of the pattern of the OPPE on the object area by projecting on a space, and wherein the obtaining comprises obtaining depth information of the input image according to Equation 1:

$$z(x_i, y_i) = g(x_i, y_i, x_p, y_p,) + w_z = \frac{D}{2\left(x_p \tan\left(\frac{\theta_p}{2}\right) - x_i \tan\left(\frac{\theta_i}{2}\right)\right) + \tan\left(\frac{\theta_i}{2}\right) - \tan\left(\frac{\theta_p}{2}\right)} + w_z \quad \text{[Equation 1]}$$

where $z(x_i, y_i)$ denotes a depth value of a pattern descriptor having coordinates $(x_i, y_i)$ in the input image, $(x_p, y_p)$ denotes coordinates of the optical pattern, $\theta_p$ denotes a projection angle of the pattern projector, $\theta_i$ denotes an incidence angle of the image obtaining unit, D denotes a center distance between the pattern projector and the image obtaining unit, and $w_z$ denotes a distortion correction item between a pattern included in the optical pattern and a pattern included in the input image.

14. The method of claim 13, wherein the one or more sample input images comprise a first sample input image that is photographed when the reflective surface is positioned at a maximum measurable distance and a second sample input image that is photographed when the reflective surface is positioned at a minimum measurable distance.

* * * * *